March 25, 1969      R. N. FRANKLIN      3,435,377

FORCE-TO-FREQUENCY TRANSDUCER

Filed March 4, 1966

INVENTOR
RICHARD N. FRANKLIN
BY
AGENT

United States Patent Office 3,435,377
Patented Mar. 25, 1969

3,435,377
FORCE-TO-FREQUENCY TRANSDUCER
Richard N. Franklin, San Diego, Calif., assignor to General Dynamics Corporation, San Diego, Calif., a corporation of Delaware
Filed Mar. 4, 1966, Ser. No. 531,900
Int. Cl. H03c *3/28;* H03b *5/38*
U.S. Cl. 332—26            15 Claims

ABSTRACT OF THE DISCLOSURE

A transducer which produces variations in its output frequency in response to the variations of an applied force by loading a sensing element and thereby varying the natural frequency at which it is vibrating.

---

This invention relates to force responsive transducers and particularly to a transducer adapted to provide an output signal whose frequency varies as a function of applied force.

In the conventional transducer a regulated voltage or current input is required since the analog output is directly proportional to the input voltage or current.

The semi-conductor strain gauge transducer is quite temperature sensitive and transducers using vibrating wire systems are very sensitive to shock.

The proposed F.M. transducer overcomes these above-mentioned disadvantages. The apparatus of the present invention comprises essentially: (a) a strain gauge bridge, the individual elements of which are carried by an elastic metallic sensing element and positioned in areas of great stress concentration (e.g. such as near holes cut through the walls of a hollow cylinder configuration); (b) a driving coil arrangement adapted to effect an oscillation of the sensing element at a preselected reference frequency; and (c) a force transfer means adapted to apply a force to the element in proportion to a parameter being sensed (such as a diaphragm and push rod structure in a pressure sensing application). As to operation, the constant frequency output of the strain gauge bridge under reference condition is frequency modulated in direct relation to the applied parameter-derived forces which vary the resonant frequency of the oscillating member.

Thus the natural frequency of a sensing element or member is changed by a load acting thereon in torsion or flexure and utilizing a semi-conductor strain gauge bridge in combination therewith to derive an output proportional to the applied load.

It is therefore an object of this invention to provide a transducer with F.M. output which is rugged to shocks and insensitive to temperature changes.

It is another object of this invention to provide a transducer which does not require a regulated voltage input because its accuracy depends only upon the frequency.

It is another object of this invention to provide a transducer or loadcell wherein the natural frequency of a sensing member is changed by a torsional of flexural loading and a semi-conductor strain gauge bridge is used as an output.

It is another object of the present invention to provide a transducer with an F.M. output which eliminates a need for a subcarrier oscillator.

It is still another object of the present invention to provide a transducer which has an F.M. output and wherein the frequency output is unaffected by line length in "land line" application.

Furthermore, this invention provides other objects, features and advantages which will become fully apparent from the following detailed description taken in conjuction with the accompanying drawings which illustrate and clarify one of the preferred embodiments of the apparatus, in which.

In general the basic structural part of the proposed F.M. transducer is a sensing element or member being preferably of a high elastic metallic material. The configuration of the sensing element is carefully calculated as to thickness and length, in order to obtain the desired operating frequency. To be compatible with existing F.M. systems a frequency of 10,500 c.p.s. may be chosen.

The sensing element may be of a cylindrical shape, a flat plate or beam plate and be used in torsion or flexure. The effective vibrating mass could be on the end (cantilever-mounting) or inbetween two similar elements (loadcell) and force may be transmitted likewise, on one end or on both ends when the mass is in the middle of two sensing elements.

However, these different types of configuration of a sensing element depend on their individual application and are of a purely engineering nature.

The proposed invention, as illustrated, comprises a force responsive transducer device having a sensing element equipped with a force transmitting means, movably mounted therein, for cantilever-mounting with a to be measured force parameter containing structure. An electronic force generator acts as an oscillating drive means and is electromagnetically connected to said sensing means or element for driving said sensing means to oscillate at its natural frequency. The sensing means is further provided with stress concentration means being a plurality of holes and strain gauge means bonded adjacent these stress concentration means and connected through a suitable balancing circuit forming a bridge. A clipping circuit is electrically connected to the output of the bridge and arranged to equalize the received variable amplitudes of the bridge signal into a frequency modulated signal having a frequency varying in direct proportion with the measured parameter variations.

Figure 1:
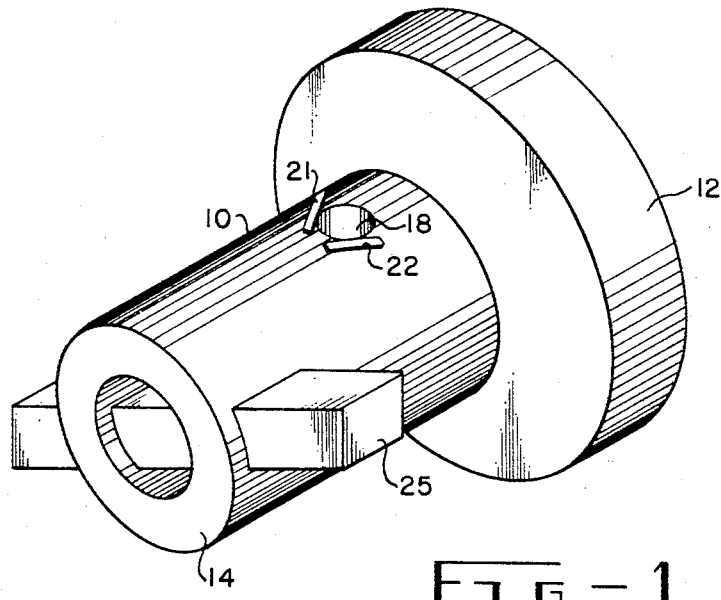
FIGURE 1 is a perspective view of the sensing element used in the present invention.

Referring now to the drawings wherein like reference characters designate corresponding parts throughout FIGURES 1 through 4, there is shown in FIGURE 1, an elastic metallic hollow cylindrical shaped member or sensing element 10 having a first end portion 12 for mounting and a second end portion 14. A plurality of holes 18 and 20 providing stress concentration areas are located in opposed relationship with one another in the wall structure of the sensing element 10. A pair of semi-conductor strain gauges 21 and 22 are bonded immediately next to the opening 18 and a second pair of semi-conductor strain gauges 23 and 24 are bonded immediately next to the stress concentration hole 20. An electromagnetic core 25 is mounted at the second end 14 of the member 10.

Figure 2:
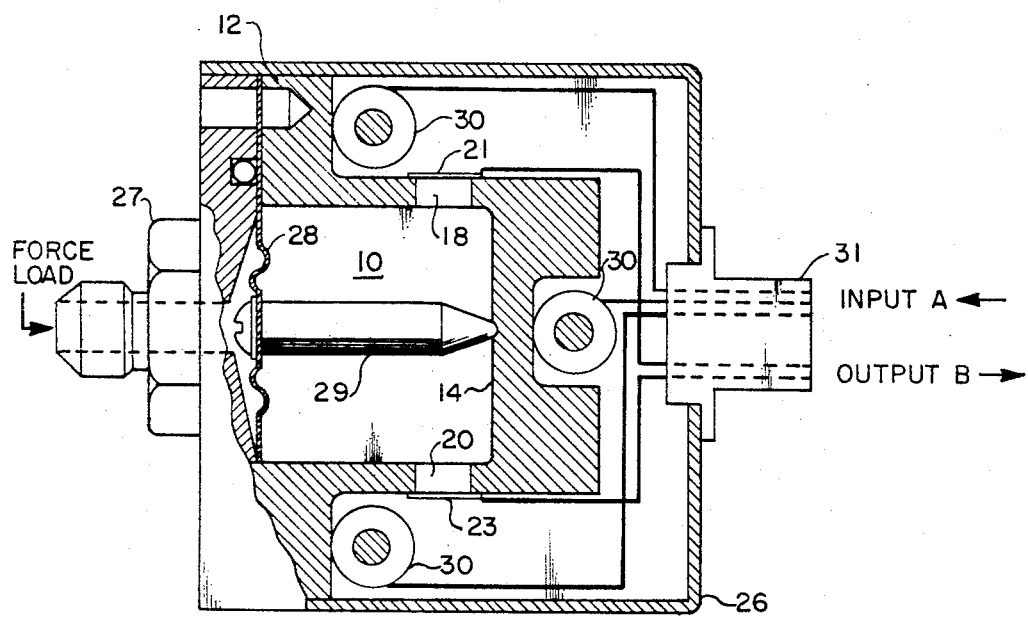
FIGURE 2 is a cross-section of a transducer using slightly different sensing element as shown in FIGURE 1.

FIGURE 2 illustrates a slightly different configuration of the sensing element mounted in a casing means 26. The element 10 is mounted by conventional means in a cantilever position through mounting means 27. A diaphragm 28 is mounted on the first end portion of the member 12 and has in its center a thereon mounted pulse rod 29 which extends coincidentally with the major axis of the member 10 resting against the inside of the closed second end portion 14. Insulating drive means being three electromagnetic coils 30 are mounted adjacent said member 10. An input-output connector 31 is inserted in the casing 26 and shows diagrammatically the inside circuit configuration connecting the semi-conductor strain gauges in a balanced circuit and connecting the coils 30 electrically to an input pulse generator means (not shown).

Figure 3:
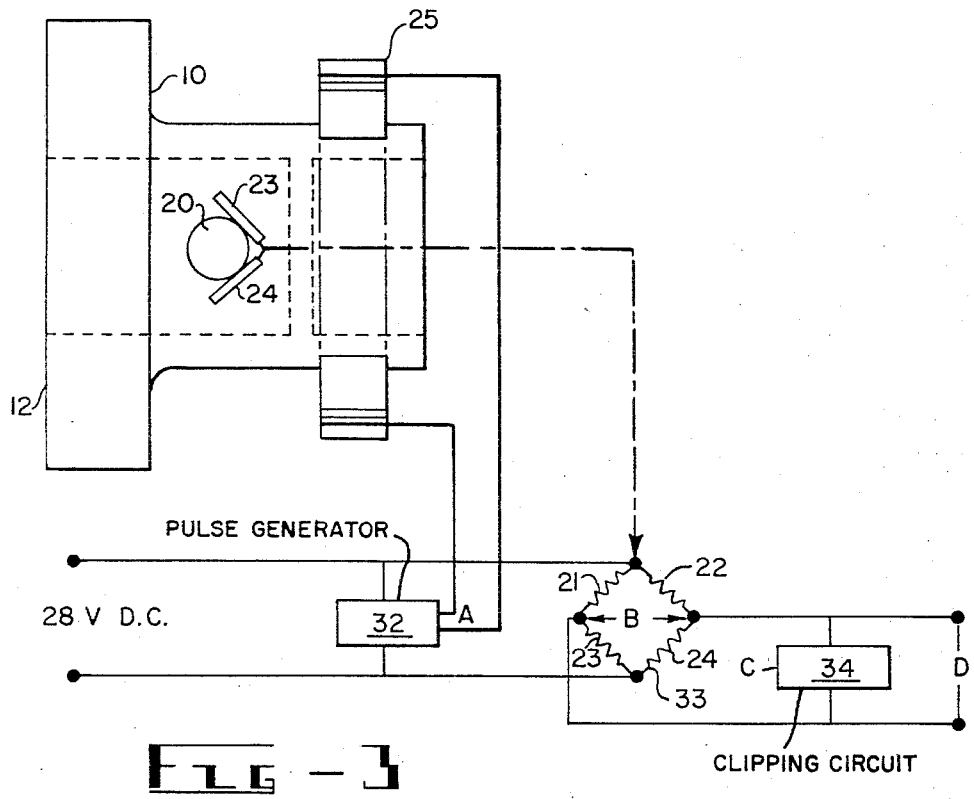
FIGURE 3 is a schematic diagram of the transducer including its electronic circuit arrangement.

FIGURE 3 illustrates a schematic diagram of the transducer including its electronic circuit arrangement. An irregular 28 volt D.C. input source is used to provide a pulse generator circuit 32 with an input signal A and provides a potential across the strain gauge bridge 33. The output circuit of the bridge 33 is directly connected to a clipping circuit 34 to equalize the irregular received amplitudes of that signal C into a frequency modulated output signal D.

Figure 4:
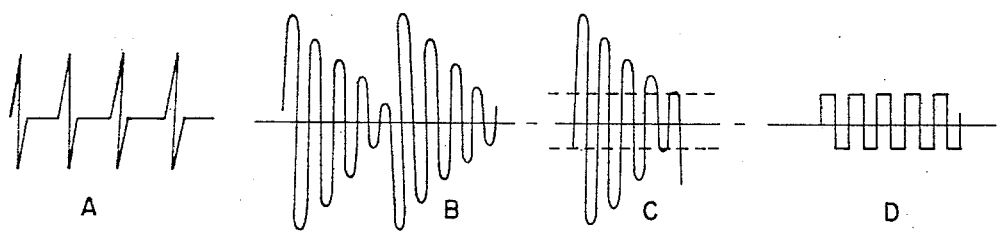
FIGURE 4 represents the various shapes of signals occurring at different points in the schematic diagram shown in FIGURE 3.

In FIGURE 4 there is shown the signal wave shape characteristics shown at several points measured in the circuit of FIGURE 3. At point A the pulse shown is of predetermined intervals in phase with the natural frequency of the sensing element or member 10. At point B a signal having a damping characteristic is shown to be the output from bridge 33. At point C the clipper network or circuit cuts the amplitudes evenly in order to provide a frequency modulated signal as shown at point D being the output signal of the transducer.

Having thus described the figures by reference characters the operation of the transducer is as follows:

The cantilever-mounted cylindrical shaped member 10 acts as a tuning fork or sensing element when it oscillates at its natural frequency. The oscillation is created by an electromagnetic driving force which sustains the oscillation at predetermined pulses A. The element or sensing member 10 operates in torsional vibration. Operation in this mode was chosen to minimize the effects of extraneous vibration which is normally rectilinear. Of course, it should be understood that there are several other well known methods which could be employed to excite the sensing element 10. When the element vibrates at its natural frequency the basic signal generated by the semi-conductor strain gauge bridge mounted on the sensing element will be identical in frequency. In the configurations shown, a hole 18 is drilled through the sensing element. Strain near the edge of the hole, in a direction of 45° from the center line of the sensing element, is approximately four times the normal strain at this point than without a hole. This fact was publicized in "Advanced Mechanics of Materials" by Seely and Smith, page 388. By utilizing this stress concentration amplification in combination with semi-conductor strain gauges bonded at a 45° angle, a very small torsional load will yield a reasonable output signal.

In regard to the strain gauges it is well known that, if two active gauges are placed on a bending beam, or on a cylinder in torsion, one gauge will be in tension thus increasing its resistance and one gauge is in contraction thus decreasing its resistance. Thus, in our configuration, a thermo expansion strain causes both resistances 21 and 22 to increase the same amount which will result in a zero output. Because a strain due to load causes one gauge to increase in resistance while the other decreases, the result is additive. Thus, the configuration used, yields two times the output due to load and theoretically zero output due to temperature changes. By using four gauges, all of them are additive due to load and yet still have temperature compensation.

Now by using stress concentration the strain on two of the four strain gauges is approximately four times the normal strain. The gauges are mounted as close to the hole as possible. Thus, there are two amplifications in this system. First, the hole stress concentration and second, the balancing circuit of the strain gauges employed. By activating the pulse generator 32 (see FIGURE 3), a pulse A of predetermined intervals and amplitude will excite the tuning or sensing element 10 at its natural frequency. Through our amplification system provided by stress concentration and semi-conductor strain gauges located at the positions mentioned above, the semi-conductor strain gauges receive signals which together produce an output signal at B FIGURE 3, which is shown in FIGURE 4B.

Input loads such as forces or pressures which are to be measured by the transducer are connected to the transducer by a pulse rod 29 which receives the parameter to be measured. The pulse rod 29 will transfer the force or pressure to the sensing member 10 and, accordingly, will change the natural frequency and thus change the basic signal of the bridge and as a result thereof change the frequency of the F.M. output signal. Thus, the F.M. output signal depends directly on the load quantity. In order to obtain an F.M. output signal, there is connected directly in the output of the bridge circuit a clipper network or means 34 which cuts the amplitude peaks of the signal into a frequency modulated output signal. It should be understood that various modifications in the electronic circuitry as described herein could be accomplished, such as a feedback circuit which would be connected between the pulse generator 32 and the clipping circuit 34 (see FIGURE 3). In which case, the pulse network 33 becomes an amplifier as well as a pulse network. By using such a feedback circuit, the system starts oscillating at its natural frequency and the amplitude will build up theoretically to infinity. The damping in the system will limit oscillations and the output will be continuous with a near constant amplitude. In such a case, the damping can easily be controlled by limiting the direct current through the driving coils. However, feedback in electronic circuits is well known in the electronic art and does not impair the novelty of the present invention.

I claim:
1. A frequency modulated output transducer comprising:
 (a) a sensing element,
 (b) a first means for loading said element by a force to be measured,
 (c) a second means for exciting said element at its natural frequency,
 (d) stress concentration areas provided on said sensing element by at least one opening provided therein,
 (e) semi-conductor strain gauge bridge means bonded at said stress concentration areas responsive to said first and second means for producing an output in phase with said force to be measured, and
 (f) a clipping means for changing said output signal in a frequency modulated signal.

2. The frequency modulated transducer as claimed in claim 1 wherein said force to be measured is applied to said sensing element in linear torsion.

3. The frequency modulated transducer as claimed in claim 1 wherein said force to be measured is applied to said sensing element in linear flexure.

4. A force responsive frequency modulated transducer comprising in combination:
 (a) a sensing element of cylindrical configuration having a first and second closed end portion,
 (b) said first end portion being of an elastic material carrying a force transmitting means extending against said second closed end portion inside said element,
 (c) mounting means provided at said first end portion for mounting said transducer in close association with the source of force to be measured,
 (d) semi-conductor strain gauge bridge means bonded on said element between said first and said second end portion,
 (e) said strain gauge bridge comprising two pairs of two semi-conductor strain gauges,
 (f) said element provided with a pair of apertures in opposed relationship with one another and normal to said element major axis,
 (g) each said pair of semi-conductor strain gauges bonded at said aperture edge so that each of said gauges of each pair is located at a substantial 45° with said major axis and substantially normal with respect to one another, and (h) driving means connected adjacent said sensing element for inducing torsional vibration in said element at its natural frequency.

5. The force responsive transducer as claimed in claim 4 wherein a clipping circuit means is electrically connected with said strain gauge bridge output for equalizing received variable amplitudes of said strain gauge bridge output signal into a frequency modulated signal which frequency variations is in proportion with said measured force variations of said associated body.

6. The force responsive transducer as claimed in claim 4 wherein said driving means comprises at least one electromagnetic coil being energized at predetermined intervals for effecting an oscillation of said sensing element at its natural frequency.

7. A force responsive transducer device comprising:
(a) a sensing element, including a force transmitting means movably mounted therein, for cantilever-mounting with a to be measured force parameter containing structure,
(b) oscillating drive means connected to said sensing means for driving said sensing means to oscillate at its natural frequency,
(c) said sensing means provided with stress concentration means,
(d) strain gauge means bonded adjacent said stress concentration means and connected through suitable balancing circuits into a strain gauge bridge circuit, and
(e) clipping circuit means electrically connected to said strain gauge bridge for equalizing received signal variable amplitudes into a frequency modulated signal having a frequency varying in phase with said measured parameter variations.

8. A force responsive frequency modulated transducer comprising:
(a) an elastic metallic hollow wall cylindrical-shaped member having a first and second end portion,
(b) said first end portion adapted for cantilever-mounting of said member and provided with a thereon mounted diaphragm,
(c) said second end portion of said hollow-shaped member having a closure mounted thereon,
(d) a pulse rod mounted on said diaphragm and extending substantially coincident with said member major axis against said inside second end closure of said member,
(e) a pair of stress concentration areas provided by substantially perpendicular to said axis opposedly arranged wall openings in said member,
(f) a pair of semi-conductor strain gauges bonded directly next to each said opening,
(g) suitable circuit means connecting each said pair of semi-conductor strain gauges into a balancing bridge circuit, and
(h) driving means arranged near said member for effecting an oscillation thereof.

9. A force responsive transducer as claimed in claim 8 wherein electrical connection is provided between said balancing bridge and a clipping circuit means so that a frequency modulated output signal is obtained which varying frequency is in proportion with force variations received by said pulse rod.

10. The force responsive transducer as claimed in claim 8 wherein said pair of semi-conductor strain gauges are bonded at a 45° angle with respect to said major axis of said member so that each of said strain gauges of said pair of strain gauges are positioned at a 90° angle from one another.

11. The force responsive transducer as claimed in claim 8 wherein said driving means for effecting an oscillation of said member comprises at least one electromagnetic coil electrically connected to a pulse generator means delivering a predetermined pulse at regular intervals.

12. The force responsive transducer as claimed in claim 8 wherein said driving means comprises mechanical vibration means mounted adjacent said member for effecting oscillation thereof at said member natural frequency.

13. A force responsive transducer comprising:
(a) an elastic metallic hollow wall cylindrical-shaped member having a first and second end portion,
(b) said first end portion adapted for cantilever mounting of said member and provided with a thereon mounted diaphragm,
(c) said second end portion of said hollow-shaped member being integrally closed,
(d) a pulse rod mounted on said diaphragm and extending substantially coincident with said member major axis against said inside second end closure of said member,
(e) a pair of stress concentration areas provided by substantially perpendicular to said axis opposedly arranged wall openings in said member,
(f) a pair of semi-conductor strain gauges bonded directly next to each said opening, each said resistor of said pair at a 90° angle from one another and each positioned at a 45° angle with respect to said major axis of said member,
(g) suitable circuit means connecting each said pair of strain gauges into a balancing bridge circuit,
(h) driving means for effecting an oscillation of said member comprising at least one electromagnetic coil electrically connected to a pulse generator means delivering a predetermined pulse at regular intervals, and
(i) electrical connecting means provided between said balancing bridge with a clipping circuit means, for obtaining a frequency modulated signal, so that said frequency modulated output signal is obtained wherein said varying frequency is in proportion with force variations received by said pulse rod.

14. The force responsive transducer as claimed in claim 13 wherein pressure intake means are connected to said mounting means at said first end portion for providing pressure force upon said diaphragm from an associated body to be pressure force measured.

15. A force responsive transducer as claimed in claim 13 wherein a casing is provided closing said member including said balancing bridge and electromagnetic coil means and wherein said casing comprises an input/output connector providing connection to said pulse generator means and clipping circuit means at a remote location.

References Cited

UNITED STATES PATENTS

| | | | |
|---|---|---|---|
| 2,641,741 | 6/1953 | Peterson | 331—139 X |
| 2,907,897 | 10/1959 | Sander | 331—65 X |
| 2,968,943 | 1/1961 | Statham. | |
| 3,063,023 | 11/1962 | Dacey et al. | |
| 3,187,579 | 6/1965 | Ferran et al. | 73—398 |
| 3,204,463 | 9/1965 | Taber. | |

ALFRED L. BRODY, *Primary Examiner.*

U.S. Cl. X.R.

73—88.5, 141, 398; 331—65, 139; 332—29